United States Patent
Zhu et al.

(10) Patent No.: US 12,418,489 B2
(45) Date of Patent: Sep. 16, 2025

(54) FRAME PREEMPTION METHOD AND APPARATUS, DEVICE AND STORAGE MEDIUM

(71) Applicant: ZTE Corporation, Shenzhen (CN)

(72) Inventors: Xiangyang Zhu, Shenzhen (CN); Jinghai Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/273,821

(22) PCT Filed: Feb. 9, 2022

(86) PCT No.: PCT/CN2022/075739
§ 371 (c)(1),
(2) Date: Jul. 24, 2023

(87) PCT Pub. No.: WO2022/183890
PCT Pub. Date: Sep. 9, 2022

(65) Prior Publication Data
US 2024/0305573 A1    Sep. 12, 2024

(30) Foreign Application Priority Data
Mar. 2, 2021   (CN) .......................... 202110231516.7

(51) Int. Cl.
*H04L 47/24* (2022.01)
*H04L 47/2408* (2022.01)
*H04L 47/28* (2022.01)
*H04L 47/36* (2022.01)
*H04L 47/43* (2022.01)

(52) U.S. Cl.
CPC ........ *H04L 47/245* (2013.01); *H04L 47/2408* (2013.01); *H04L 47/28* (2013.01); *H04L 47/36* (2013.01); *H04L 47/43* (2022.05)

(58) Field of Classification Search
None
See application file for complete search history.

(56) References Cited

U.S. PATENT DOCUMENTS

2011/0019552 A1*  1/2011  Karaoguz ............. H04L 45/124
                                                       370/236
2016/0150530 A1*  5/2016  Fujisaki .............. H04W 36/005
                                                       370/329

(Continued)

FOREIGN PATENT DOCUMENTS

| CN | 110784418 A | 2/2020 |
| CN | 111970271 A | 11/2020 |
| CN | 112105080 A | 12/2020 |

OTHER PUBLICATIONS

Zhou, IEEE Analysis and Implementation of Packet Preemption for Time Sensitive Networks, 2017, IEEE (Year: 2017).*

(Continued)

*Primary Examiner* — Fadi Haj Said
(74) *Attorney, Agent, or Firm* — CANTOR COLBURN LLP (57) ABSTRACT

A frame preemption method and apparatus, a device, and a storage medium are provided. The method includes: determining that an express Media Access Control (eMAC) packet needs to be sent; and sending the eMAC packet when timing reaches a preemption delay target value.

16 Claims, 6 Drawing Sheets

(56) References Cited

U.S. PATENT DOCUMENTS

| | | | |
|---|---|---|---|
| 2017/0006362 A1* | 1/2017 | Shang | H04L 12/422 |
| 2019/0199641 A1* | 6/2019 | Lo Bello | H04L 47/22 |
| 2020/0136953 A1 | 4/2020 | Datta et al. | |
| 2021/0119922 A1* | 4/2021 | Zhang | H04L 41/5022 |
| 2022/0353834 A1* | 11/2022 | Qiang | H04W 56/001 |
| 2024/0267288 A1* | 8/2024 | Zhao | H04L 41/0803 |

OTHER PUBLICATIONS

International Search Report for corresponding application PCT/CN2022/075739 filed Feb. 9, 2022; Mail date Apr. 25, 2022.
European Search Report for Application No. 22762357.6, dated Jul. 16, 2024, 14 pages.
IEEE Standards Association, "IEEE Standard for Ethernet—Amendment 5: Specification and Management Parameters for Interspersing Express Traffic" server date Apr. 18, 2017, 58 pages.

* cited by examiner

FRAME PREEMPTION METHOD AND APPARATUS, DEVICE AND STORAGE MEDIUM

CROSS-REFERENCE TO RELATED APPLICATION

This application is a National Stage Filing of PCT International Application No. PCT/CN2022/075739 filed on Feb. 9, 2022, which is based upon and claims priority to Chinese Patent Application No. 202110231516.7, filed on Mar. 2, 2021, the entire disclosure of which is incorporated herein by reference.

TECHNICAL FIELD

The present disclosure relates to network communications technologies, and in particular, to a frame preemption method and apparatus, a device, and a storage medium.

BACKGROUND

Figure 1:
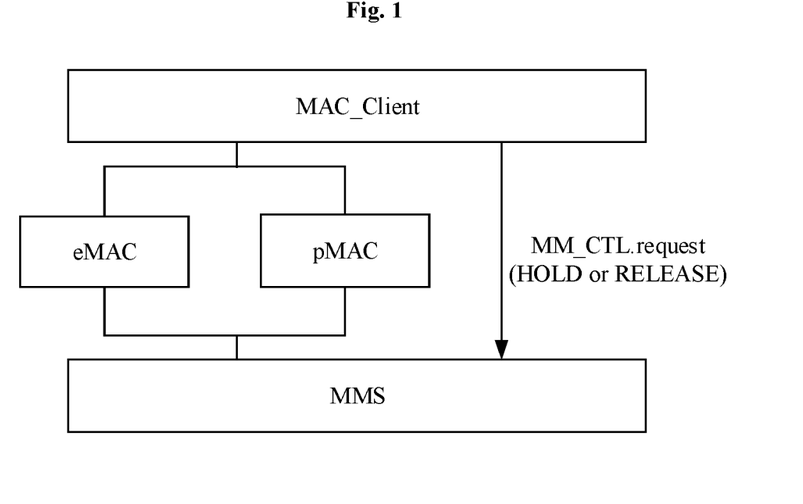
FIG. 1 is a schematic diagram of a relationship between components in a frame preemption mechanism and a preemption service primitive in the existing technology.

The IEEE 802.3br standard provides a frame preemption mechanism. As shown in FIG. 1, a new Media Access Control (MAC) Merge Sublayer (MMS) is added to associate an express MAC (eMAC) and a preemptable MAC (pMAC) with a physical Sublayer, so that the eMAC can preempt a frame of a pMAC. Since transmission states of pMAC frames may be different when the pMAC frames are preempted, the current frame preemption mechanism may result in that the preemption delay for the frame is uncertain on each hop, thereby resulting in a frame preemption jitter related to the number of hops.

Therefore, in a case that the eMAC is used for a Time Sensitive Networking (TSN) service with strict requirements on determinism, how to eliminate a problem of end-to-end jitter caused by a frame preemption mechanism in the existing technology is an urgent problem to be solved.

SUMMARY

The embodiments of the present disclosure provide a frame preemption method, including: determining that an express Media Access Control (eMAC) packet needs to be sent; and sending the eMAC packet when timing reaches a preemption delay target value.

The embodiments of the present disclosure provide a communication device, including: a memory and one or more processors, wherein the memory is configured to store one or more programs; and the one or more processors are configured to implement, when executing the one or more programs, the method in any of the preceding embodiments.

The embodiments of the present disclosure provide a storage medium. The storage medium stores a computer program. The computer program, when being executed by a processor, causes the processor to implement the method in any of the preceding embodiments.

DETAILED DESCRIPTION

Embodiments of the present disclosure will be described hereinafter with reference to the drawings. The following describes the present disclosure with reference to the accompanying drawings of the embodiments. The examples are only used to explain the present disclosure, but not used to limit the scope of the present disclosure.

In order to make the objectives, technical solutions, and advantages of the present disclosure clearer and more comprehensible, the following describes the embodiments of the present disclosure in detail with reference to the accompanying drawings. It is important to note that the embodiments in the present disclosure and characteristics in the embodiments can be combined arbitrarily without conflicts.

Figure 2:
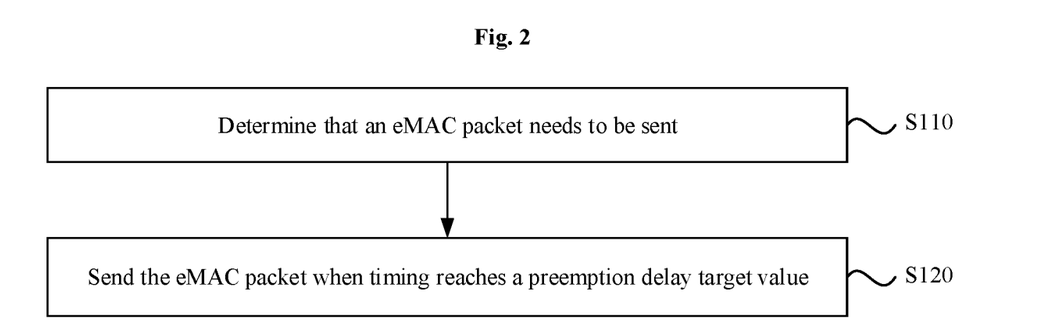
FIG. 2 is a schematic flowchart of a frame preemption method according to the embodiments of the present disclosure.

FIG. 2 is a schematic flowchart of a frame preemption method according to the embodiments of the present disclosure. The method is applicable to a case where an eMAC preempts a pMAC frame. The method may be executed by a frame preemption apparatus provided in the embodiments of the present disclosure. The frame preemption apparatus may be implemented by software and/or hardware and may be integrated in a network communication device.

As shown in FIG. 2, a frame preemption method provided in the embodiments of the present embodiment includes operations S110 and S120.

At S110, it is determined that an eMAC packet needs to be sent.

A priority of an eMAC packet is higher than that of a pMAC packet, and the eMAC packet with a high priority can interrupt a pMAC packet with a low priority that is being sent, so as to reduce waiting time of the eMAC packet with the high priority: When the eMAC needs to send data or receives a frame preemption indication, it is determined that an eMAC packet needs to be sent, that is, it is determined that frame preemption needs to be performed.

In some embodiments, the operation of determining that an eMAC packet needs to be sent includes: in a case where the eMAC packet or a frame preemption request is received, it is determined that an eMAC packet needs to be sent.

Referring to FIG. 1, an MMS component provides a preemption service primitive MM_CTL.request for a MAC-_Client component, where a parameter of MM_CTL.request may be HOLD or RELEASE. In a case where the MAC-_Client component sends a frame preemption request to the MMS component, i.e., a request in which the parameter of the MM_CTL.request parameter is HOLD, it may be determined that the eMAC needs to send data, i.e., it is determined that an eMAC packet needs to be sent. In a case where the MMS component receives an eMAC packet, it may also be determined that the eMAC needs to send data, that is, it is determined that an eMAC packet needs to be sent.

In the current implementation, the frame preemption may be triggered by a frame preemption request sent by the MAC_Client component to the MMS component, or may be triggered by an eMAC packet.

At S120, the eMAC packet is sent when timing reaches a preemption delay target value.

The preemption delay target value is a definite value for the preemption delay of each frame.

When the timing does not reach the preemption delay target value, whether the timing reaches the preemption delay target value is continuously judged until the timing reaches the preemption delay target value, and the eMAC packet is sent when it is determined that the timing reaches the preemption delay target value.

Figure 3:
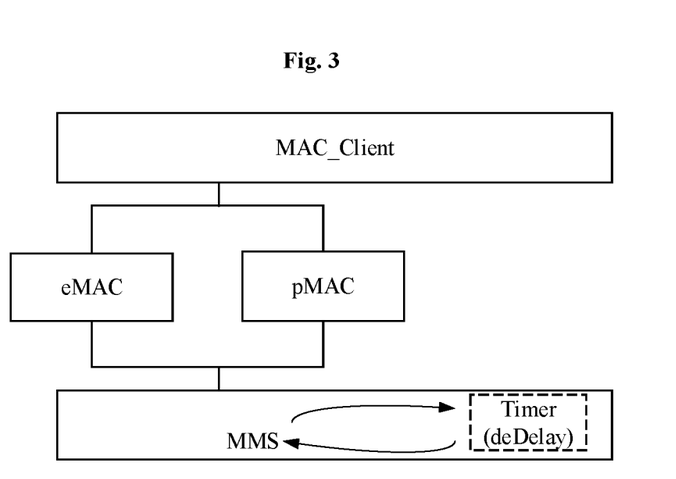
FIG. 3 is a schematic diagram of a relationship between components in a frame preemption mechanism according to the embodiments of the present disclosure.

As an exemplary implementation, a timer may be added in the MMS. As shown in FIG. 3, the timer may be configured to control the time between receiving an eMAC packet or receiving a frame preemption request (i.e., a frame preemption indication) and allowing the eMAC packet to be sent. A dpDelay parameter for timing of the timer is used for storing the preemption delay target value, and the dpDelay parameter is configurable. The MMS may control the timer to start timing, and may also control the timer to reset (for example, clear), and the timer may report the timing to the MMS.

In some embodiments, the preemption delay target value may be determined in at least one of following manners:
  during startup of a communication device, the preemption delay target value may be calculated according to a minimum value of a non-last slice of a preemptable Media Access Control (pMAC) packet and a port transmission rate.
  the preemption delay target value may be determined according to static configuration;
  a network configuration related to the preemption delay target value may be received; and
  the preemption delay target value may be configured according to a parameter carried in a frame preemption request.

After the frame preemption is triggered, the MMS stops sending a pMAC packet within a specified period of time, and after the MMS stops sending the pMAC packet, the MMS may start to send the eMAC packet, thereby realizing that the eMAC preempts the frame of the pMAC.

When the frame preemption occurs, in order to make full use of the bandwidth, the MMS fragments the pMAC packet and sends the fragmented pMAC packet. In a case where there is no pMAC packet or the last bit of the pMAC packet has been sent, the pMAC packet is not fragmented. In a case where a pMAC packet is being sent, whether fragmentation can be performed on the pMAC packet needs to be judged according to a total frame length, the number of sent bytes and the number of remaining bytes, and it is determined when the pMAC packet can give up its transmission opportunity.

When the pMAC packet is fragmented, the minimum size of a non-last fragment is 64*(1+addFragSize)−4, where addFragSize is a parameter related to fragmentation of the pMAC packet in IEEE 802.3br. When the frame length of the pMAC packet is smaller than 64*(1+addFragSize)−4+64 bytes, the pMAC packet cannot be fragmented and therefore cannot be preempted.

Figure 4:
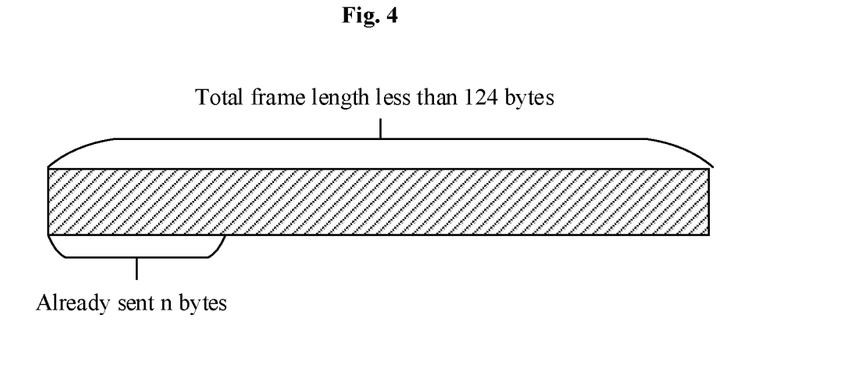
FIG. 4 is a schematic diagram of a frame preemption occasion according to the embodiments of the present disclosure.
Figure 5:
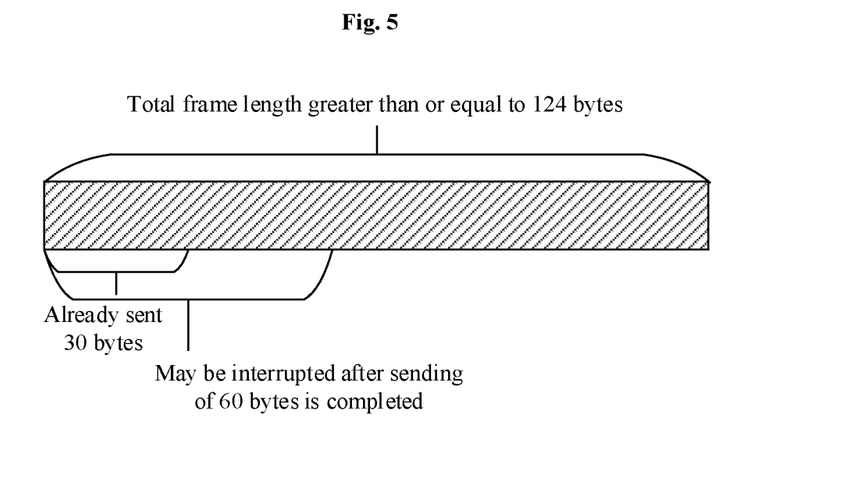
FIG. 5 is a schematic diagram of a frame preemption occasion according to the embodiments of the present disclosure.
Figure 6:
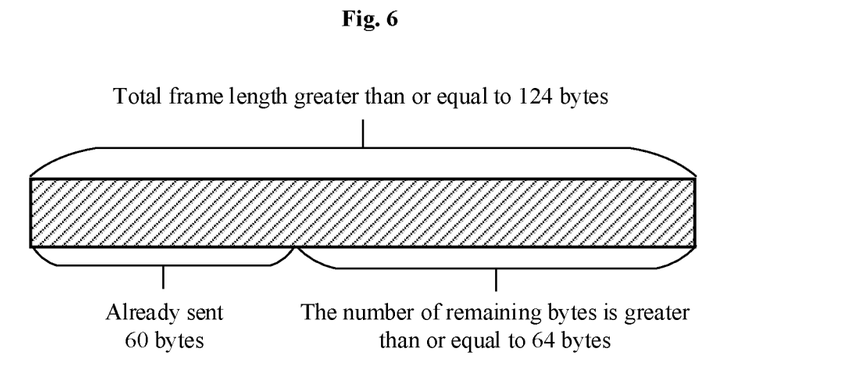
FIG. 6 is a schematic diagram of a frame preemption occasion according to the embodiments of the present disclosure.
Figure 7:
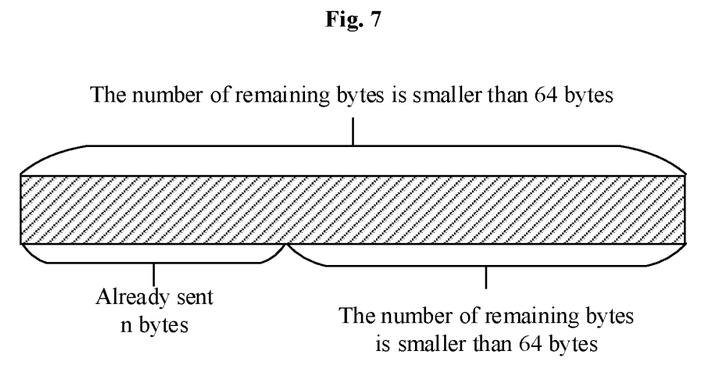
FIG. 7 is a schematic diagram of a frame preemption occasion according to the embodiments of the present disclosure.

Assuming that the value of the addFragSize parameter is 0, the minimum size of the non-last fragment of the pMAC packet is 60 bytes. As shown in FIG. 4, in a case where the total frame length of the pMAC packet is smaller than 124 bytes, the pMAC packet cannot be preempted, and the transmission opportunity can only be relinquished to the eMAC when the transmission of the frame is completed. As shown in FIG. 5, in a case where the number of bytes that have been sent in the current frame is smaller than 60 bytes and the total frame length is greater than or equal to 124 bytes, the frame can be preempted after the transmission of 60 bytes of the frame has been completed. As shown in FIG. 6, in a case where the number of bytes that have been sent in the current frame is greater than or equal to 60 bytes and the number of remaining bytes in the current frame is greater than or equal to 64 bytes, the frame is immediately preempted. As shown in FIG. 7, in a case where the number of bytes that have been sent in the current frame is greater than or equal to 60 bytes, but the number of remaining bytes in the current frame is smaller than 64 bytes, the transmission opportunity can only be released after the transmission of the entire frame has been completed.

In practical applications, the preemption delay is also affected by header overhead, which includes a preamble and an interframe gap, therefore, based on different transmission states of a pMAC frame during preemption, the preemption delay for the frame of per hop is uncertain, resulting in preemption jitter related to the number of hops. Therefore, in the embodiments of the present disclosure, the frame preemption delay of each hop is set as a certain determined value, that is, the preemption delay target value is stored in the dpDelay parameter of the timer, so as to eliminate the problem of jitter caused by a frame preemption mechanism in the existing technology.

In an exemplary implementation, the preemption delay target value may be calculated according to a minimum value of a non-last slice of a pMAC packet and a port transmission rate during startup of a communication device, and the calculated preemption delay target value is stored in a dpDelay parameter of a timer.

The preemption delay target value may be set to be greater than or equal to transmission duration of a maximum fragment of the pMAC packet.

The minimum value of the non-last fragment of the pMAC packet is 64*(1+addFragSize)−4 bytes, and when the frame length of the pMAC packet is smaller than 64*(1+addFragSize)−4+64 bytes, the pMAC packet cannot be fragmented. Therefore, the maximum fragment length of the pMAC packet is 64*(1+addFragSize)−4+64 bytes, i.e., 64*(1+addFragSize)+59 bytes. In some exemplary implementations, in order to ensure that no frame preemption jitter exists, the preemption delay target value may be set as transmission duration greater than or equal to 64*(1+addFragSize)+59 bytes, that is:

$$dpDelay \geq \frac{(64*(1+addFragSize)+59)*8}{M} \text{ s,}$$

where M is a port transmission rate in bit/s.

In addition, during startup of the communication device, the MMS may calculate the preemption delay target value according to the above method, and store the preemption delay target value in the dpDelay parameter of the timer.

In an exemplary implementation, assuming that the value of the addFragSize is 0, then the minimum value of the non-last fragment of the pMAC packet is 60 bytes, and the preemption delay target value should be greater than or equal to the frame transmission duration for 64*(1+0)+59=123 bytes.

Assuming that the transmission rate of a physical port is 1 G bit/s, the preemption delay target value is determined as:

$$dpDelay \geq \frac{123*8 \text{ bit}}{10^{\wedge}9 \text{ bit/s}} = 984 \text{ ns.}$$

Assuming that the value of the addFragSize is 3, then the minimum value of the non-last fragment of the pMAC packet is 252 bytes, and the preemption delay target value should be greater than or equal to the frame transmission duration for 64*(1+3)+59=315 bytes.

Assuming that the transmission rate of a physical port is 10 G bit/s, the preemption delay target value is determined as:

$$dpDelay \geq \frac{315*8 \text{ bit}}{10^{\wedge}10 \text{ bit/s}} = 252 \text{ ns.}$$

The preemption delay target value may alternatively be obtained from external configuration.

In an exemplary implementation, the preemption delay target value may be statically configured, in particular in a specific scenario of preemption delay configuration under determined traffic.

In an exemplary implementation, the preemption delay target value may be configured at the network side, for example, dynamically configured through a southbound interface of the controller. For example, the configuration parameter may be delivered by the control plane to the timer in the MMS through a southbound interface protocol such as Network Configuration Protocol (NETCONF), or Path Computation Element Protocol (PCEP).

The present implementation is suitable for preemption delay configuration in a flexible scenario. For example, in a case where a TSN service only requires real-time performance and has a high tolerance for a jitter, the preemption delay target value may be configured as 0; and in a case where the TSN service has a strict requirement for the jitter, a suitable preemption delay target value may be delivered according to specific requirements of the service.

In an exemplary implementation, the preemption delay target value may also be configured according to a parameter carried in the frame preemption request. In a case where the frame preemption instruction (or frame preemption request/indication) is triggered by a preemption service primitive MM_CTL.request sent by the MAC_Client to the MMS, the dpDelay parameter may also be configured in the MAC_Client component, and then the dpDelay parameter may be carried to the MMS through the preemption service primitive.

In the current implementation, when frame preemption is required, the eMAC packet is sent only when timing of the timer reaches the preemption delay target value in the dpDelay parameter. In a case where a pMAC packet is being sent currently, transmission of the pMAC packet is interrupted, wherein when the number of sent bytes of the pMAC packet is less than 60 bytes, or the number of remaining bytes is less than 64 bytes, the pMAC packet continues to be sent, and in other cases, the sending of the pMAC packet is immediately stopped.

According to the technical solution provided in the embodiments of the present disclosure, in a case where frame preemption is required, an eMAC packet is sent when timing reaches a preemption delay target value, so that a frame preemption delay of each hop is the preemption delay target value which is a determined value, thereby eliminating a problem of end-to-end jitter caused by a frame preemption mechanism in the existing technology.

In some embodiments, before the operation of sending the eMAC packet when the timing reaches the preemption delay target value, the method further includes:

It is confirmed that a value of a dejitter frame preemption enablement parameter (deJitterEnabled) is valid.

The dejitter frame preemption enablement parameter is a parameter added in the MMS, and is used to indicate whether to adopt the frame preemption method provided in the embodiments of the present disclosure, so as to eliminate a problem of jitter caused by a frame preemption mechanism in the existing technology. For example, in a case where the value of the dejitter frame preemption enablement parameter is valid, for example, in a case where the value is true, the frame preemption method provided in the embodiments of the present disclosure is used; and in a case where the value of the dejitter frame preemption enablement parameter is invalid, for example, the value is false, the frame preemption method in the existing technology is used.

After receiving an eMAC packet or a frame preemption request, it is firstly judged whether the value of the dejitter frame preemption enablement parameter is valid, in a case where the value is valid, the eMAC packet is sent when the timing reaches the preemption delay target value, and in a case where the value is invalid, processing is carried out according to a frame preemption mechanism in the existing technology.

In some embodiments, the value of the dejitter frame preemption enablement parameter may be determined in at least one of following manners:

- the value of the dejitter frame preemption enablement parameter is determined according to a configuration received from a control plane;
- the value of the dejitter frame preemption enablement parameter is determined according to static configuration;
- the value of the dejitter frame preemption enablement parameter is determined according to a default value;
- the value of the dejitter frame preemption enablement parameter is determined according to the preemption delay target value; and
- the value of the dejitter frame preemption enablement parameter is configured according to a parameter carried in a frame preemption request.

In an exemplary implementation, the value of the dejitter frame preemption enablement parameter may be delivered through a control plane, may be statically configured, and may alternatively be configured as a default value.

In an exemplary implementation, the value of the dejitter frame preemption enablement parameter may be derived and determined according to the preemption delay target value. For example, the value of the dejitter frame preemption enablement parameter may be derived and determined according to the dpDelay parameter (namely, the preemption delay target value) carried in the frame preemption request, and may alternatively be derived and determined according to the stored dpDelay parameter. For example, in a case where the preemption delay target value is greater than 0), the value of the dejitter frame preemption enablement parameter is valid by default, for example, the value of the dejitter frame preemption enablement parameter is set to true.

In an exemplary implementation, the value of the dejitter frame preemption enablement parameter may be further configured according to a parameter carried in the frame preemption request. In a case where the frame preemption instruction (i.e., the frame preemption request or indication) is triggered by a preemption service primitive MM_CTL-.request sent by the MAC_Client to the MMS, the dejitter frame preemption enablement parameter may also be configured to the MAC_Client component, and then the dejitter frame preemption enablement parameter may be carried to the MMS through the preemption service primitive.

Figure 8:
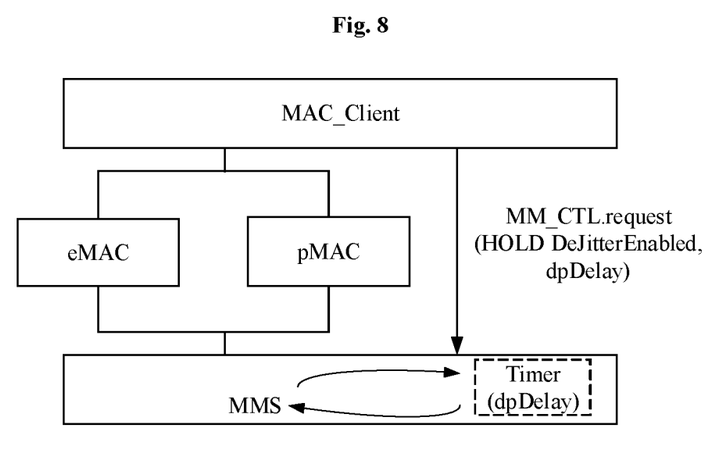
FIG. 8 is a schematic diagram of a preemption service primitive according to the embodiments of the present disclosure.

In an exemplary implementation, a configuration parameter may be added to the MAC_Client component, and then the MAC_Client carries the configuration parameter to the MMS through a preemption service primitive. When the configuration parameter is sent to the MAC_Client component, two parameters are added in the MM_CTL.request for indicating whether to enable the frame preemption method in the embodiments of the present disclosure and determining the preemption delay target value. For example, the preemption service primitive is modified as shown in FIG. 8, and a deJitterEnabled parameter and a dpDelay parameter are added in the MM_CTL.request.

Alternatively, only one deDelay parameter may be added to the MM_CTL.request, and when the MMS receives the preemption service primitive, in a case where deDelay>0), the deJitterEnabled parameter is set to true by default, and the frame preemption method in the embodiments of the present disclosure is enabled; and in a case where deDelay=0), the deJitterEnabled parameter is set to false by default, and the frame preemption process in the existing technology is adopted.

With regard to whether to enable the frame preemption method in the embodiments of the present disclosure and how to determine the preemption delay target value, corresponding configuration strategies and manners may be flexibly adopted according to the requirements in actual application scenarios.

In some embodiments, before the operation of sending the eMAC packet when the timing reaches the preemption delay target value, the method may further include: timing is started in a case where the timing has not been not started; and whether the timing reaches the preemption delay target value is judged in a case where the timing has been started: correspondingly, after sending of the eMAC packet is completed, the timing is reset.

After the MMS receives the eMAC packet or the frame preemption indication, in a case where the timing has not been not started currently, the MMS starts timing, and in a case where the timing has been started, the MMS judges whether the timing reaches the preemption delay target value. The operation of sending the eMAC packet will be executed only when the timing reaches the preemption delay target value. After sending of the eMAC packet is completed, the timing is reset, for example, the timing may be cleared.

As an exemplary implementation, after receiving the eMAC packet or the frame preemption indication, the MMS judges whether the timer has started timing: in a case where the timer has not started timing, the timer is controlled to start timing: in a case where the timer has started timing, the timer is queried for the timing duration, and the timer reports the timing duration to the MMS, so that the MMS can judge whether the timer has timed to the preemption delay target value. As an alternative implementation, after starting timing, the timer may also actively report to the MMS that the timer has timed to the preemption delay target value when the timing reaches the preemption delay target value.

When the timing has been started, it indicates that a previously received to-be-sent eMAC packet exists, and in this case, the currently received eMAC packet may be cached; and when the timing reaches the preemption delay target value, the previously received to-be-sent eMAC packet and the cached currently received eMAC packet are sent. In this case, these eMAC packets may be considered as packets within a small period, and even in a case where the frame preemption delays are not strictly consistent, the problem of end-to-end jitter caused by different frame preemption delays will not be caused.

In some embodiments, the method may further include: in a case where a packet is being sent currently, a packet type of the packet is determined; and in a case where the packet is a pMAC packet, transmission of the pMAC packet is interrupted.

After receiving the eMAC packet or the frame preemption indication, the MMS judges whether the MMS is currently sending a packet: in a case where the MMS is not sending a packet, when a timer is not started, the MMS starts the timer, and sends the eMAC packet when the timing of the timer reaches the preemption delay target value; and in a case where the MMS is currently sending a packet, the packet type of the currently sent packet is judged first.

In some embodiments, the operation of determining the packet type of the packet may include: the packet type of the packet may be determined according to a value of a packet transmitting variable.

The packet transmitting variable may be an internal variable indicating whether the MMS is sending an eMAC packet, or an internal variable indicating whether the MMS is sending a pMAC packet.

Taking an internal variable emacTransmitting indicating whether the MMS is sending an eMAC packet as an example, when the MMS is currently sending a packet, in a case where the value of emacTransmitting is true, it indicates that the MMS is sending an eMAC packet: in a case where the value of emacTransmitting is not true (such as false), it indicates that the MMS is sending a pMAC packet.

Correspondingly, after sending the eMAC packet and after sending of the eMAC packet is completed, the method may further include an operation of setting the value of the packet transmitting variable.

For example, after sending the eMAC packet, the value of emacTransmitting is set as true; and after sending of the eMAC packet is completed, the value of emacTransmitting is set as false.

In a case where a packet is currently being sent, in a case where a packet type of the packet is eMAC, the currently received eMAC packet is directly sent. In some exemplary implementations, the eMAC packet may be cached, the cached eMAC packet (namely, the currently received eMAC packet) is directly sent after sending of the packet currently being sent is completed, and a value of the packet transmitting variable is set as a value indicating that the MMS is sending an eMAC packet, for example, the emacTransmitting value is set as true. When the sending of the cached eMAC packet is completed, the value of the packet transmitting variable is set as a value indicating that the MMS is not sending an eMAC packet, for example, the emacTransmitting value is set as false, and the timer is reset and cleared.

In a case where a packet is being sent currently, in a case where a packet type of the packet is pMAC, the transmission of the pMAC packet currently being sent needs to be interrupted. When the number of sent bytes of the pMAC packet is smaller than 60 bytes, or the number of remaining bytes of the pMAC packet is smaller than 64 bytes, the sending of the pMAC packet is continued; and in other cases, the sending of the pMAC packet is stopped. At the same time, whether a timer has started timing is judged, in a case where the timer has not started timing, the timer is controlled to start timing, the eMAC packet is sent when the timing of the timer reaches the preemption delay target value, and the value of the packet transmitting variable is set as a value indicating that the MMS is sending an eMAC packet, for example, the value of emacTransmitting is set as true. When the sending of the eMAC packet is completed, the value of the packet transmitting variable is set as a value indicating that the MMS is not sending an eMAC packet, the value of emacTransmitting is set as false, and the timer is reset and cleared.

Figure 9:
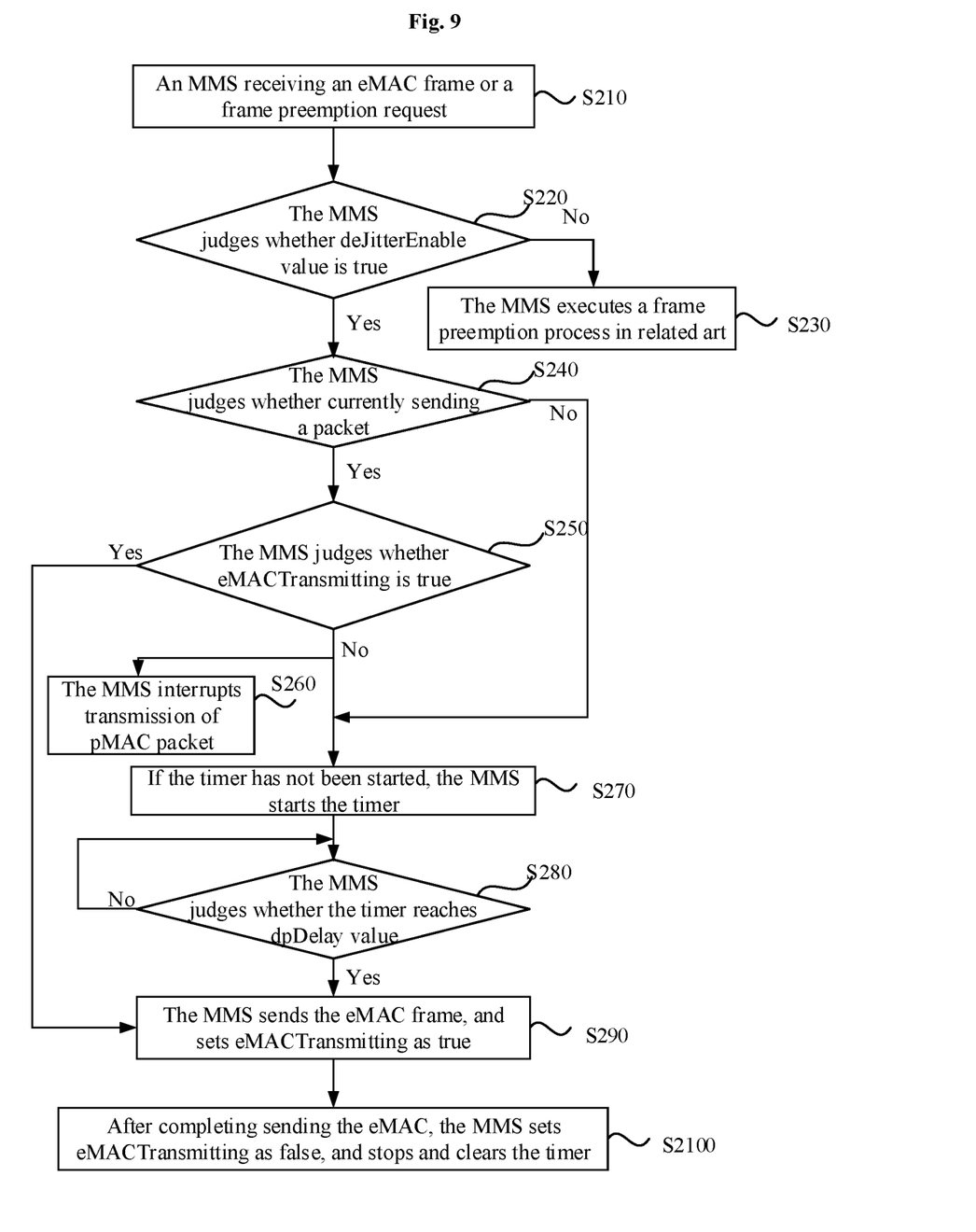
FIG. 9 is a schematic flowchart of a frame preemption method according to the embodiments of the present disclosure.

In an exemplary embodiment, FIG. 9 shows a flowchart of a frame preemption method.

As shown in FIG. 9, the frame preemption method includes operations S210 to S2100.

At S210, an MMS receives an eMAC frame or a frame preemption indication.

At S220, the MMS judges whether a value of a dejitter frame preemption enablement parameter, e.g., deJitterEnabled is true, in a case where the value of the dejitter frame preemption enablement parameter, e.g., deJitterEnabled is false, S230 is executed, and in a case where the value of the dejitter frame preemption enablement parameter, e.g., deJitterEnabled is true, S240 is executed.

At S230, the MMS executes a frame preemption process in the existing technology.

At S240, the MMS determines whether the MMS is currently sending a packet: in a case where the MMS is currently sending a packet, S250 is performed; otherwise, S270 is performed.

At S250, the MMS judges whether a value of a packet transmitting variable, e.g., eMACTransmitting is true: in a case where the value of the packet transmitting variable, e.g., eMACTransmitting is true, S290 is executed; and in a case where the value of the packet transmitting variable, e.g., eMACTransmitting is false, S260 and S270 are executed.

At S260, the MMS interrupts transmission of the pMAC packet.

When the number of sent bytes of the pMAC frame is smaller than 60 bytes, or the number of remaining bytes of the pMAC frame is smaller than 64 bytes, the pMAC frame continues to be sent until the fragment ends or the transmission ends; and in other cases, the transmission of the pMAC frame is stopped.

At S270, in a case where a timer has not been started, the MMS starts the timer and the timer begins timing.

At S280, the MMS judges whether the timing of the timer reaches a preemption delay target value, e.g., dpDelay, in a case where the timing of the timer reaches the preemption delay target value, S290 is executed, and in a case where the timing of the timer does not reach the preemption delay target value, S280 is executed.

At S290, the MMS sends the eMAC frame, and sets the value of the packet transmitting variable, e.g., eMACTransmitting, as true.

At S2100, after the sending of the eMAC frame is completed, the MMS sets the value of the packet transmitting variable, e.g., eMACTransmitting, as false, and stops and clears the timer.

Figure 10:
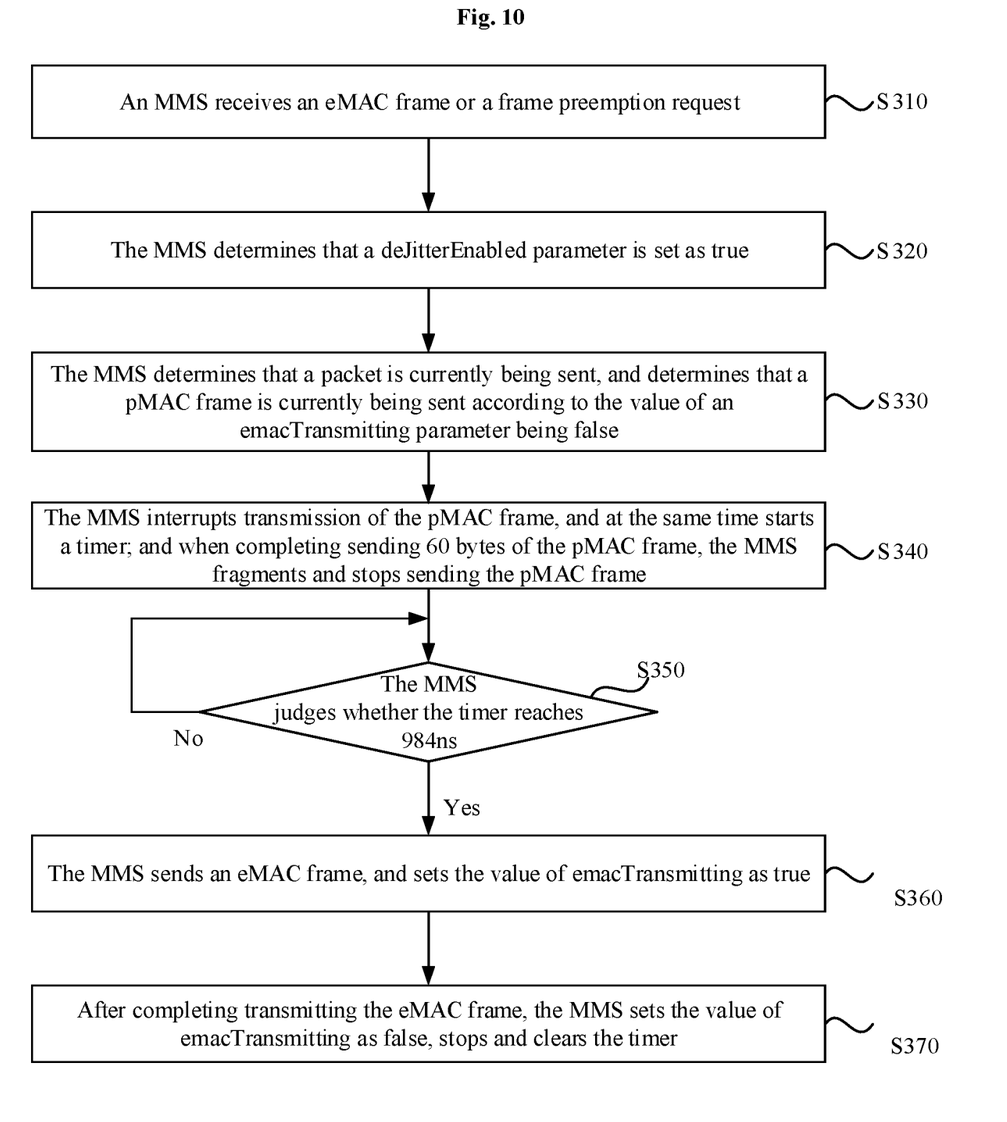
FIG. 10 is a schematic flowchart of a frame preemption method according to the embodiments of the present disclosure.

The following description will be given with reference to an exemplary implementation. In the example, it is assumed that an MMS is transmitting a pMAC frame which has a total size of 150 bytes, and 30 bytes of the pMAC frame have currently been sent. Further, it is assumed that the value of the addFragSize parameter is 0, the port rate is 1 G bit/s, the deJitterEnabled parameter has currently been configured as true, and the dpDelay parameter has been configured as 984 ns. Since a pMAC frame is currently being sent, the emacTransmitting parameter is false, and the timer has not started timing. In this case, in a case where the MMS receives an eMAC frame or a preemption indication, the frame preemption flow is as shown in FIG. 10 and includes operations S310 to S370.

At S310, the MMS receives an eMAC frame or a frame preemption indication.

At S320, the MMS determines that the deJitterEnabled parameter is currently set as true.

The deJitterEnabled parameter being true indicates that a dejitter frame preemption flow provided in the embodiments of the present disclosure is enabled/adopted.

At S330, the MMS determines that a packet is being sent currently, and determines that a pMAC frame is being sent currently according to the value of the emacTransmitting parameter which is currently set as false.

At S340, the MMS interrupts the transmission of the pMAC frame, and starts a timer for timing: when the MMS completes sending 60 bytes of the pMAC frame, the fragment of the pMAC frame ends and the MMS stops sending the pMAC frame.

At S350, the MMS determines whether the timer reaches 984 ns: in a case where the timer does not reach 984 ns, the timer continues timing and S350 is executed; and in a case where the timer reaches 984 ns, S360 is executed.

At S360, the MMS sends the eMAC frame, and sets the value of the emacTransmitting parameter as true.

At S370, after completing sending the eMAC frame, the MMS sets the value of the emacTransmitting parameter as false, and stops and clears the timer.

Figure 11:
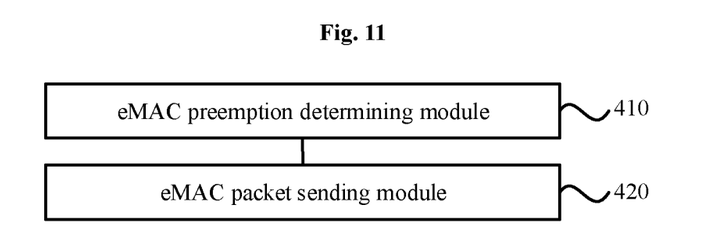
FIG. 11 is a schematic structural diagram of a frame preemption apparatus according to the embodiments of the present disclosure.

In an exemplary embodiment, FIG. 11 is a schematic structural diagram of a frame preemption apparatus according to the embodiments of the present disclosure. The apparatus may be implemented by software and/or hardware and integrated in a network communication device. As shown in FIG. 11, the frame preemption apparatus includes an eMAC preemption determining module 410 and an eMAC packet sending module 420.

The eMAC preemption determining module 410 is configured to determine that an eMAC packet needs to be sent.

The eMAC packet sending module 420 is configured to send the eMAC packet when timing reaches a preemption delay target value.

According to the technical solution provided in the embodiments of the present disclosure, in a case where frame preemption is required, an eMAC packet is sent when timing reaches a preemption delay target value, so that a frame preemption delay of each hop is the preemption delay target value which is a determined value, thereby eliminating a problem of end-to-end jitter caused by a frame preemption mechanism in the existing technology.

In some embodiments, the eMAC preemption determining module 410 is configured to, in a case of receiving the eMAC packet or a frame preemption request, determine that an eMAC packet needs to be sent.

In some embodiments, the preemption delay target value may be determined in at least one of following manners:
  during startup of a communication device, the preemption delay target value may be calculated according to a minimum value of a non-last slice of a preemptable Media Access Control (pMAC) packet and a port transmission rate.
  the preemption delay target value may be determined according to static configuration;
  a network configuration related to the preemption delay target value may be received; and
  the preemption delay target value may be configured according to a parameter carried in a frame preemption request.

In some embodiments, the frame preemption apparatus may further include: a dejitter frame preemption enablement confirming module, configured to confirm, when the timing reaches the preemption delay target value and before sending the eMAC packet, that the value of the dejitter frame preemption enablement parameter is valid.

In some embodiments, the value of the dejitter frame preemption enablement parameter may be determined in at least one of following manners:
  the value of the dejitter frame preemption enablement parameter is determined according to a configuration received from a control plane;
  the value of the dejitter frame preemption enablement parameter is determined according to static configuration;
  the value of the dejitter frame preemption enablement parameter is determined according to a default value;
  the value of the dejitter frame preemption enablement parameter is determined according to the preemption delay target value; and
  the value of the dejitter frame preemption enablement parameter is configured according to a parameter carried in a frame preemption request.

In some embodiments, the frame preemption apparatus may further include: a timing module, configured to start timing in a case where the timing has not been not started and before sending the eMAC packet when the timing reaches the preemption delay target value, and judge whether the timing reaches the preemption delay target value in a case where the timing has been started; and is further configured to reset the timing after sending of the eMAC packet is completed.

In some embodiments, the frame preemption apparatus may further include: a frame preempting module, configured to determine a packet type of a sent packet in a case where a packet is currently sent; and in a case where the packet is a pMAC packet, interrupt transmission of the pMAC packet.

In some embodiments, the frame preempting module is configured to determine the packet type of the packet according to a value of a packet transmitting variable: the frame preemption apparatus may further include: a packet transmitting variable setting module, configured to set the value of the packet transmitting variable after sending the eMAC packet and after sending of the eMAC packet is completed.

In some embodiments, the frame preemption apparatus may further include: a timing cycle judging module, configured to, when the timing does not reach the preemption delay target value, continue to judge whether the timing reaches the preemption delay target value.

The frame preemption apparatus provided in the embodiments of the present embodiment is configured to implement the frame preemption method provided in the embodiments of the present disclosure. The implementation principle and technical effect of the frame preemption apparatus provided in the embodiments of the present embodiment are similar to those of the frame preemption method provided in the embodiments of the present embodiment, and will not be described repeatedly herein.

Figure 12:
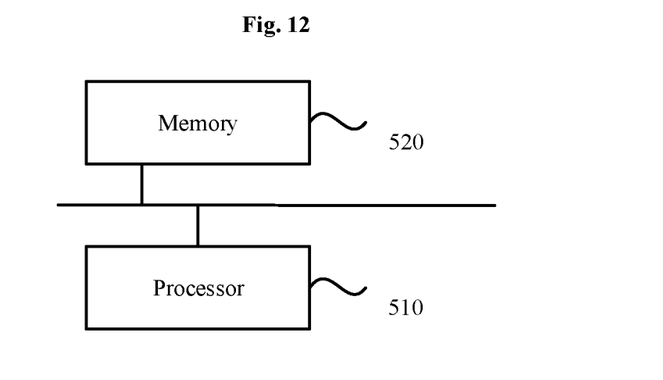
FIG. 12 is a schematic structural diagram of a communication device according to the embodiments of the present disclosure.

FIG. 12 is a schematic structural diagram of a communication device according to the embodiments of the present disclosure. As shown in FIG. 12, the device provided in the embodiments of the present disclosure includes a processor 510 and a memory 520. The number of processors 510 in the device may be one or more, and one processor 510 is taken as an example in FIG. 12. The number of the memories 520 in the device may be one or more, and one memory 520 is taken as an example in FIG. 12. The processor 510 and the memory 520 of the device may be connected through a bus or in another manner, and connection through a bus is taken as an example in FIG. 12. In the current embodiment, the communication device may be a network communication device. The communication device may further include a communication module configured to perform communication interaction with other communication devices.

As a computer-readable storage medium, the memory 520 may be configured to store a software program, a computer-executable program, and a module, such as a program instruction/module corresponding to the frame preemption method in any embodiment of the present disclosure (for example, the eMAC preemption determining module 410 and the eMAC packet sending module 420 in the frame preemption apparatus). The memory 520 may include a program storage area and a data storage area, wherein the program storage area may store an operating system and an application program required by at least one function; and the storage data area may store data created according to use of the device, and the like. In addition, the memory 520 may include a high-speed random access memory, and may further include a non-volatile memory, for example, at least one magnetic disk storage device, a flash memory device, or another non-volatile solid-state storage device. In some examples, the memory 520 may further include a memory remotely located from processor 510, which may be connected to the device over a network. Examples of such network includes, but is not limited to, the Internet, an intranet, a local area network, a mobile communication network, and a combination thereof.

The communication device provided above may be configured to execute the frame preemption method provided by any embodiment, and has corresponding functions and effects.

The embodiments of the present disclosure further provide a storage medium storing computer-executable instructions. The computer-executable instructions, when executed by a computer processor, are used for executing the frame preemption method. The method includes: determining that an eMAC packet needs to be sent; and sending the eMAC packet when timing reaches a preemption delay target value.

Those having ordinary skill in the art will appreciate that the term user device encompasses any suitable type of wireless user device, such as a mobile telephone, a portable data processing device, a portable web browser, or an in-vehicle mobile station.

In general, the various embodiments of the present disclosure may be implemented in hardware or special purpose circuits, software, logic, or any combination thereof. For example, some aspects may be implemented in hardware, while other aspects may be implemented in firmware or software that may be executed by a controller, microprocessor or other computing device, although the application is not limited thereto.

The embodiments of the application may be implemented by execution of computer program instructions by a data processor of a mobile device, such as in a processor entity, by hardware, or by a combination of software and hardware. The computer program instructions may be assembly instructions, Instruction Set Architecture (ISA) instructions, machine instructions, machine-related instructions, microcode, firmware instructions, state setting data, or source or object code written in any combination of one or more programming languages.

The block diagrams of any logic flow in the figures of the present disclosure may represent program operations, or may represent interconnected logic circuits, modules, and functions, or a combination of program operations and logic circuits, modules, and functions. The computer program may be stored on a memory. The memory may be of any type suitable to the local technical environment and may be implemented using any suitable data storage technology, such as, but not limited to, Read-Only Memory (ROM), Random Access Memory (RAM), optical memory devices and systems (Digital Video Disc (DVD) or Compact Disk (CD)), etc. Computer-readable media may include non-transitory storage media. The data processor may be of any type suitable to the local technical environment, such as, but not limited to, a general purpose computer, a special purpose computer, a microprocessor, a Digital Signal Processing (DSP), an Application Specific Integrated Circuit (ASIC), a Field-Programmable Gate Array (FGPA), and a processor based on a multi-core processor architecture.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection defined by the appended set of claims of the present disclosure.

What is claimed is:

1. A frame preemption method, comprising:
   determining that an express Media Access Control (eMAC) packet needs to be sent; and
   sending the eMAC packet when timing reaches a preemption delay target value, wherein the preemption delay target value is a definite value for the preemption delay of each frame;
   wherein the preemption delay target value is determined in at least one of following manners:
   calculating, during startup of a communication device, the preemption delay target value according to a minimum value of a non-last slice of a preemptable Media Access Control (pMAC) packet and a port transmission rate; wherein calculating the preemption delay target value according to the minimum value of the non-last slice of the pMAC packet and the port transmission rate comprises: setting the preemption delay target value as $$dpDelay \geq \frac{(64*(1+addFragSize)+59)*8}{M}s,$$

wherein M is the port transmission rate in bit/s, and addFragSize is a parameter related to fragmentation of the pMAC packet in Institute of Electrical and Electronics Engineers (IEEE) 802.3br; and
   configuring the preemption delay target value according to a parameter carried in a frame preemption request; wherein configuring the preemption delay target value according to the parameter carried in the frame preemption request comprises: configuring the preemption delay target value according to a dpDelay parameter carried through a preemption service primitive MM_CTL.request sent by a MAC_Client to a MAC Merge Sublayer (MMS).

2. The method according to claim 1, wherein determining that an eMAC packet needs to be sent comprises:
   in response to receiving the eMAC packet or a frame preemption request, determining that an eMAC packet needs to be sent.

3. The method according to claim 1, wherein before sending the eMAC packet, the method further comprises:
   confirming that a value of a dejitter frame preemption enablement parameter is valid.

4. The method according to claim 3, wherein the value of the dejitter frame preemption enablement parameter is determined in at least one of following manners:
   determining the value of the dejitter frame preemption enablement parameter according to a configuration received from a control plane;
   determining the value of the dejitter frame preemption enablement parameter according to static configuration;
   determining the value of the dejitter frame preemption enablement parameter according to a default value;
   determining the value of the dejitter frame preemption enablement parameter according to the preemption delay target value; and
   configuring the value of the dejitter frame preemption enablement parameter according to the parameter carried in the frame preemption request.

5. The method according to claim 1, wherein before sending the eMAC packet, the method further comprises: starting timing in response to the timing not having been started; and judging whether the timing reaches the preemption delay target value in response to the timing having been started; and
   after sending of the eMAC packet is completed, resetting the timing.

6. The method according to claim 1, further comprising:
   in response to the timing not reaching the preemption delay target value, continuing to judge whether the timing reaches the preemption delay target value.

7. The method according to claim 1, further comprising:
   in response to a packet is being sent currently, determining a packet type of the packet; and
   in response to the packet is a pMAC packet, interrupting transmission of the pMAC packet.

8. The method according to claim 7, wherein determining the packet type of the packet comprises:
  determining the packet type of the packet according to a variable value of a packet transmitting;
  after sending the eMAC packet, the method further comprises: setting the variable value of the packet transmitting.

9. The method according to claim 4, wherein determining the value of the dejitter frame preemption enablement parameter according to the preemption delay target value comprises:
  in response to the preemption delay target value is greater than 0, determining that the value of the dejitter frame preemption enablement parameter is valid.

10. The method according to claim 4, wherein configuring the value of the dejitter frame preemption enablement parameter according to the parameter carried in the frame preemption request comprises:
  configuring the value of the dejitter frame preemption enablement parameter according to a deJitterEnabled parameter carried through a preemption service primitive MM_CTL.request sent by a MAC_Client to a MAC Merge Sublayer (MMS).

11. A communication device, comprising: a memory, and one or more processors,
  wherein the memory is configured to store one or more programs; and
  the one or more processors are configured to implement, when executing the one or more programs, following operations:
  determining that an express Media Access Control (eMAC) packet needs to be sent; and
  sending the eMAC packet when timing reaches a preemption delay target value, wherein the preemption delay target value is a definite value for the preemption delay of each frame;
  wherein the preemption delay target value is determined in at least one of following manners:
  calculating, during startup of a communication device, the preemption delay target value according to a minimum value of a non-last slice of a preemptable Media Access Control (pMAC) packet and a port transmission rate;
  wherein calculating the preemption delay target value according to the minimum value of the non-last slice of the pMAC packet and the port transmission rate comprises: setting the preemption delay target value as $$dpDelay \geq \frac{(64*(1+addFragSize)+59)*8}{M} s,$$

wherein M is the port transmission rate in bit/s, and addFragSize is a parameter related to fragmentation of the pMAC packet in Institute of Electrical and Electronics Engineers (IEEE) 802.3br; and
  configuring the preemption delay target value according to a parameter carried in a frame preemption request; wherein configuring the preemption delay target value according to the parameter carried in the frame preemption request comprises: configuring the preemption delay target value according to a dpDelay parameter carried through a preemption service primitive MM_CTL.request sent by a MAC_Client to a MAC Merge Sublayer (MMS).

12. The communication device according to claim 11, wherein determining that an eMAC packet needs to be sent comprises:
  in response to receiving the eMAC packet or the frame preemption request, determining that an eMAC packet needs to be sent.

13. The communication device according to claim 11, wherein the one or more processors are configured to implement, when executing the one or more programs, following operations before sending the eMAC packet:
  confirming that a value of a dejitter frame preemption enablement parameter is valid.

14. The communication device according to claim 13, wherein the value of the dejitter frame preemption enablement parameter is determined in at least one of following manners:
  determining the value of the dejitter frame preemption enablement parameter according to a configuration received from a control plane;
  determining the value of the dejitter frame preemption enablement parameter according to static configuration;
  determining the value of the dejitter frame preemption enablement parameter according to a default value;
  determining the value of the dejitter frame preemption enablement parameter according to the preemption delay target value; and
  configuring the value of the dejitter frame preemption enablement parameter according to a parameter carried in a frame preemption request.

15. The communication device according to claim 11, wherein the one or more processors are further configured to implement, when executing the one or more programs, following operations:
  in response to a packet is being sent currently, determining a packet type of the packet; and
  in response to the packet is a pMAC packet, interrupting transmission of the pMAC packet.

16. A storage medium, wherein the storage medium stores a computer program, and the computer program, when being executed by a processor, causes the processor to implement following operations:
  determining that an express Media Access Control (eMAC) packet needs to be sent; and
  sending the eMAC packet when timing reaches a preemption delay target value, wherein the preemption delay target value is a definite value for the preemption delay of each frame;
  wherein the preemption delay target value is determined in at least one of following manners:
  calculating, during startup of a communication device, the preemption delay target value according to a minimum value of a non-last slice of a preemptable Media Access Control (pMAC) packet and a port transmission rate;
  wherein calculating the preemption delay target value according to the minimum value of the non-last slice of the pMAC packet and the port transmission rate comprises: setting the preemption delay target value as $$dpDelay \geq \frac{(64*(1+addFragSize)+59)*8}{M} s,$$

wherein M is the port transmission rate in bit/s, and addFragSize is a parameter related to fragmentation of the pMAC packet in Institute of Electrical and Electronics Engineers (IEEE) 802.3br; and configuring the preemption delay target value according to a parameter carried in a frame preemption request; wherein configuring the preemption delay target value according to the parameter carried in the frame preemption request comprises: configuring the preemption delay target value according to a dpDelay parameter carried through a preemption service primitive MM_CTL.request sent by a MAC_Client to a MAC Merge Sublayer (MMS).

* * * * *